March 27, 1962  W. A. KEMPFF ET AL  3,027,165
STEEL INSERT DIE-CAST FACE SEAL

Filed Aug. 13, 1959  2 Sheets-Sheet 1

United States Patent Office 3,027,165
Patented Mar. 27, 1962

3,027,165
STEEL INSERT DIE-CAST FACE SEAL
Wolfgang A. Kempff, San Mateo, and Joseph E. Lepetich, Los Altos, Calif., assignors to Federal-Mogul-Bower Bearings, Inc., Detroit, Mich., a corporation of Michigan
Filed Aug. 13, 1959, Ser. No. 833,477
7 Claims. (Cl. 277—43)

This invention relates to an improved end face seal.

Over long periods of time attempts have been made to reduce the cost of face seals. One way of doing so is to die-cast the backing ring instead of machining it from hard steel, as is necessary on the face-supporting ring. Heretofore, however, die-casting proved unsatisfactory because the torque-lock projections of the soft die-cast ring were worn and grooved by rotational impact and friction with the steel face-supporting ring. Once grooved, the projections restricted the movement of the steel ring, impeding its axial movement, and early failure or leakage resulted. Excessive torque-lock wear also caused undue rotational stress on the bellows.

The present invention has solved this problem by combining a die-cast backing ring with steel insert projections, the projections being inserted in the mold and cast integral with the die-cast backing. By using a steel face-supporting ring hard steel-against-steel contact between the face-supporting ring and the projections is achieved. As a result, practically no wear takes place at the torque locks, so that improved performance and increased seal life results.

While the basic structure may sound simple, it will be appreciated from the following description that there are other objects and advantages of the invention and other important structure therein.

Figure 1:
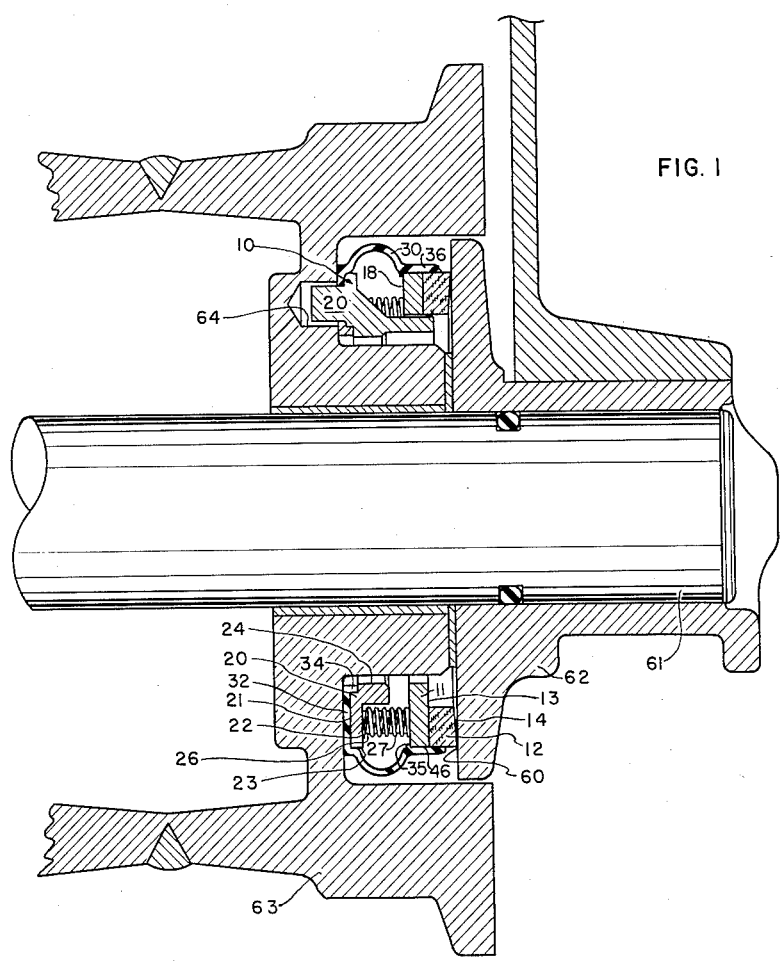
FIG. 1 is a view in elevation and in section of an installation incorporating and end face seal of the present invention.
Figure 2:
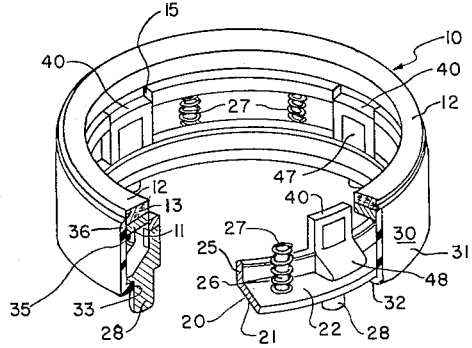
FIG. 2 is a view in perspective and partly in section of an end face seal embodying the principles of the present invention.
Figure 3:
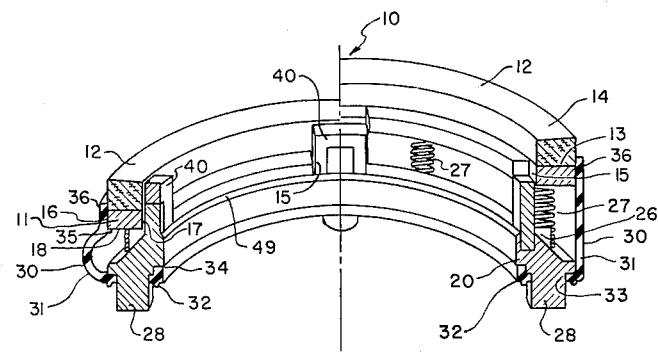
FIG. 3 is a view in perspective and in section of the seal of FIG. 2 with the left half of FIG. 3 showing the seal in its compressed position, and the right half showing it in its extended position, the sections being taken at different places through the insert members.
Figure 4:
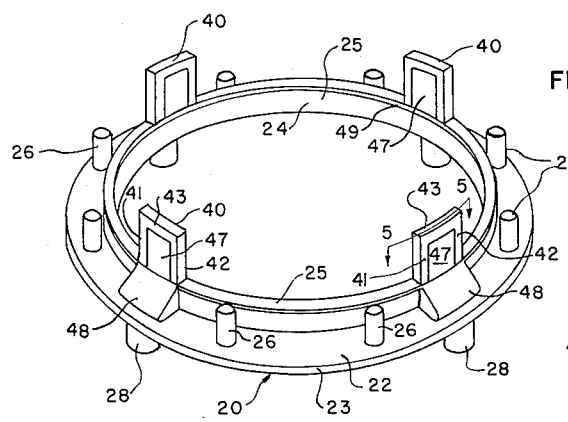
FIG. 4 is a fragmentary view in perspective of the die-cast backing member showing the projecting portions of the inserts for the torque locks.

The drawings show an end face seal 10 made up of a combination of several elements. One of these is a hard steel driven ring or face-supporting ring 11. A face sealing element, such as a cork element 12 impregnated with elastomer, e.g., Buna-N, is mounted on the outer axial face 13 of the ring 11. Preferably the axially outer surface 14 of the cork element 12 is sloped radially and axially inwardly at about 3° to the radial plane. The steel ring 11 also has a series of torque lock openings 15, an outer periphery 16, an inner periphery 17, and an inner face 18.

A backing ring 20 is die-cast from suitable metal. It has an outer axial face 21, an inner face 22, an outer periphery 23, and an inner periphery 24. A flange 25 extends along the radially inner periphery 24 and extends axially toward the steel ring 11. Also, a plurality of spring-supporting buttons 26 extend in the same direction. Springs 27 are mounted on the buttons 26 and bear against the axially inner face 18 of the steel ring 11, to provide pressure urging the rings 11 and 20 normally apart from each other. Bellows-supporting buttons 28 project from the opposite, outer, radial face.

A rubber bellows 30 has a flexible cylindrical portion 31 and a radial portion 32 provided with openings 33 that fit around the buttons 28 and retain the bellows 30 against rotation relative to the ring 20. Preferably, the bellows 30 has an axially inturned inner rim 34, which holds the seal assembly square against the spring pressure, without distorting the gasket end of the bellows 30 over the buttons 28. Part of the bellows' cylindrical portion 31 is bonded to the outer periphery 16 of the ring 11 and a short radially extending portion 35 is bonded to the inner face 18. The cylindrical portion 31 extends beyond the outer face 13 of the ring 11 to provide a sleeve portion 36 surrounding and cemented to the face sealing element 12. This portion 36 centers the sealing element 12 at the time of assembly, prevents its slippage, and holds the seal parts concentric.

Figure 5:
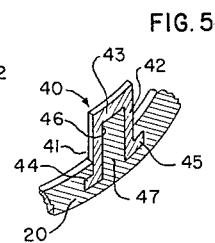
FIG. 5 is a view in section taken along the line 5—5 in FIG. 4.

In this invention, the die-cast ring 20 is provided with hard steel torque locks 40 that fit in the openings 15 and engage the steel ring 11. In the form of torque lock 40 shown in FIG. 5, separate hard steel members are provided for each torque lock 40, each generally shaped like an inverted U with outwardly extending arms. In other words, there are two axially extending arms 41 and 42 joined together by an outer-end portion 43, and there are diverging end members 44 and 45 at the other end. The steel member 40 is sunk into the die-cast ring 20 and the space 46 in between the arms 41 and 42 is filled with the die-casting material 47, to help unite the two separate members. Preferably, a sloping base 48 is provided on the die-cast ring to strengthen it at the point of juncture, this portion assuming the load to which the lugs 40 are subjected, and the die-cast material is also widened to provide a strengthened portion 94 on the inner periphery 24.

Figure 6:
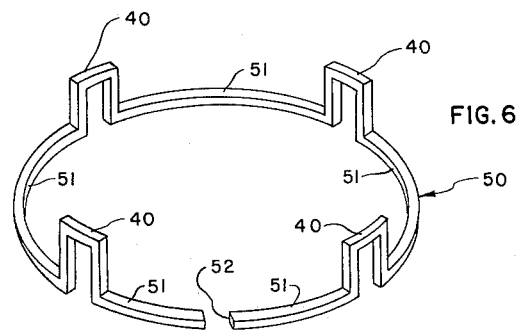
FIG. 6 is a view in perspective of a modified form of steel ring insert.

For many purposes, such as reducing the time in the die-casting operation, it is preferable to make a complete ring 50 containing all the torque locks 40 as shown in FIG. 6. Here the locks 40 are all joined together by a base 51, except that there is a break or split 52 in the ring 50 which enables a sort of spring action to take place and enables adjusting it to the die in which the ring 20 is cast.

When the seal 10 is assembled, its end face member 12 is urged against a sealing face 60, as shown in FIG. 1. In the installation shown, a shaft 61 carries a flange 62, on which the face 60 is formed. The seal 10 is carried by a housing member 63 in an annular hollow thereof. The springs 27 urge the cork face member 12 against the flange face 60 and the bellows 30 flexes to absorb axial movement, enclosing the seal elements and preventing leakage between the rings 11 and 20. The buttons 28 fit in openings 64 and provide a torque lock for the seal, while the steel members 40 engage the openings 15 to provide a torque lock between the steel ring 11 and the backing ring 20. The contact of hard steel against hard steel minimizes wear and ensures proper movement of the ring 11 relative to the ring 20. The integration of the ring 20 with the projections 40 prevents breakage thereof. The length of the buttons 26 is such that they act as a stop by engaging the face 18, and they are proportioned relatively to the steel members 40 so that when the seal is fully closed, the steel members do not extend beyond the face 12.

To those skilled in the art to which this invention relates, many additional changes in construction and widely differing embodiments of the invention will suggest themselves without departing from the spirit and scope of the invention as defined in the claims.

What is claimed is:

1. An end face seal, including in combination a hard steel, driven, face-supporting ring, generally rectangular in cross-section and having an axially outer face, an axially inner face, a radially outer periphery and a radially inner periphery, said inner periphery being notched to provide a plurality of torque-lock notches; a face sealing ring secured to and supported by said outer face; a relatively soft die-cast backing and driving ring having an axially inner radial face, an axially outer radial face, a radially inner periphery, a radially outer periphery, an axial flange at said inner periphery, a series of spring-supporting buttons extending from said inner radial face axially toward said axially inner face of said steel ring, and a plurality of bellows-locking buttons extending in the opposite axial direction out from said axially outer face of said die-cast ring; a plurality of helical springs mounted on said spring-supporting buttons and compressed between said inner faces; an annular one-piece elastomeric bellows having a cylindrical portion extending along the outer peripheries of said rings, a radial portion engaging the outer face of said die-cast ring and perforated to receive said bellows-locking buttons, and a radial portion extending inwardly on and bonded to the inner face of said steel ring, the cylindrical portion ending beyond said outer face of said steel ring so as to ring a portion of said face-sealing ring and provides an elastomeric guide for centering said face-sealing ring; and generally rectangular steel insert means with generally radial end edges embedded in and locked to said die-cast ring and projecting axially from said inner face of said die-cast ring into said torque-lock notches into engagement with said steel ring.

2. An end face seal, including in combination a hard steel ring having an outer face, an inner face, an outer periphery and an inner periphery, and a plurality of torque-lock notches; a face sealing ring secured to and supported by said outer face; a relatively soft die-cast backing ring having an inner radial face, an outer radial face, an inner periphery, an outer periphery, an axial flange at said inner periphery, and a series of spring-supporting means on said inner radial face; spring means supported by said spring-supporting means and compressed between said inner faces; an annular bellows secured to both said rings and having a cylindrical portion extending between the outer peripheries of said rings; and steel insert means embedded in and locked to said die-cast ring and projecting axially from said inner face of said die-cast ring into said torque-lock notches into engagement with said steel ring, said steel insert means comprising a series of separate inverted U-shaped members with outwardly extending basal arms embedded in said die-cast ring, the space enclosed by the U being filled by die-cast metal of said die-cast ring.

3. An end face seal, including in combination a hard steel ring having an outer face, an inner face, an outer periphery and an inner periphery, and a plurality of torque-lock notches; a face sealing ring secured to and supported by said outer face; a relatively soft-die-cast backing ring having an inner radial face, an outer radial face, an inner periphery, an outer periphery, an axial flange at said inner periphery, and a series of spring-supporting means on said inner radial face; spring means supported by said spring-supporting means and compressed between said inner faces; an annular bellows secured to both said rings and having a cylindrical portion extending between the outer peripheries of said rings; and steel insert means embedded in and locked to said die-cast ring and projecting axially from said inner face of said die-cast ring into said torque-lock notches into engagement with said steel ring, said steel insert means comprising a series of projecting generally rectangular members with outwardly extending basal arms embedded in said die-cast ring.

4. The seal of claim 1 wherein said steel insert means comprises a series of separate members with outwardly extending basal arms embedded in said die-cast ring.

5. The seal of claim 1 wherein said steel insert means comprises a single steel ring with U-shaped projections.

6. The seal of claim 3 wherein the series of members comprising said steel insert means are individual members separate from each other.

7. The seal of claim 3 wherein the series of members comprising said steel insert means are connected together and comprise a single steel ring with said rectangular members as projections thereon.

References Cited in the file of this patent
UNITED STATES PATENTS

| | | |
|---|---|---|
| 1,012,657 | Kurschus | Dec. 29, 1911 |
| 2,277,771 | McNab | Mar. 31, 1942 |
| 2,301,723 | Vedovell | Nov. 10, 1942 |
| 2,694,588 | Wooden | Nov. 16, 1954 |
| 2,797,939 | Laser | July 2, 1957 |
| 2,858,149 | Laser | Oct. 28, 1958 |
| 2,862,734 | Northup | Dec. 2, 1958 |
| 2,912,265 | Brummer | Nov. 10, 1959 |
| 2,943,872 | Cahill et al. | July 5, 1960 |